(12) United States Patent
Suess

(10) Patent No.: US 8,992,033 B2
(45) Date of Patent: Mar. 31, 2015

(54) DISPLAY ELEMENT FOR A DISPLAY UNIT IN A VEHICLE

(76) Inventor: Manfred Suess, Remchingen (DE)

(*) Notice: Subject to any disclaimer, the term of this patent is extended or adjusted under 35 U.S.C. 154(b) by 128 days.

(21) Appl. No.: 13/577,423

(22) PCT Filed: Dec. 9, 2010

(86) PCT No.: PCT/EP2010/069255
§ 371 (c)(1),
(2), (4) Date: Nov. 19, 2012

(87) PCT Pub. No.: WO2011/098171
PCT Pub. Date: Aug. 18, 2011

(65) Prior Publication Data
US 2013/0058113 A1 Mar. 7, 2013

(30) Foreign Application Priority Data
Feb. 10, 2010 (DE) .......................... 10 2010 007 387

(51) Int. Cl.
G02B 5/30 (2006.01)
B60K 37/02 (2006.01)
B60K 35/00 (2006.01)
G01D 11/28 (2006.01)
(Continued)

(52) U.S. Cl.
CPC ............... B60K 37/02 (2013.01); B60K 35/00 (2013.01); G01D 11/28 (2013.01); G02F 1/133528 (2013.01); B60K 2350/2021 (2013.01); B60K 2350/203 (2013.01); B60K 2350/206 (2013.01); B60K 2350/2086 (2013.01); B60K 2350/2091 (2013.01); B60K 2350/2095 (2013.01); B60K 2350/941 (2013.01); G02B 5/3033 (2013.01); G02F 2001/133311 (2013.01)

USPC .......... 362/19; 362/23.01; 362/488; 362/489; 362/509

(58) Field of Classification Search
CPC ........... B60K 2350/2095; G01D 11/28; G02B 5/3033; G02F 1/133528
USPC ........................ 362/23.01, 488, 489, 509, 19
See application file for complete search history.

(56) References Cited

U.S. PATENT DOCUMENTS 5,962,109 A * 10/1999 Schwietz .................. 428/195.1
6,961,178 B2 * 11/2005 Sugino et al. ............. 359/485.03
7,038,746 B2 * 5/2006 Tominaga et al. .............. 349/96
(Continued)

FOREIGN PATENT DOCUMENTS

CN 2639065 9/2004
CN 101111879 1/2008
(Continued)

OTHER PUBLICATIONS

Japanese Office Action dated Nov. 14, 2013.
(Continued)

*Primary Examiner* — Stephen F Husar
*Assistant Examiner* — James Cranson, Jr.
(74) *Attorney, Agent, or Firm* — Fletcher Yoder, P.C.

(57) ABSTRACT

The invention relates to a display element for the display unit of a vehicle. The display element can be backlit by means of at least one light source. The display element contains a film with identifying elements, and further contains a polarizing film. The films are arranged one above the other and are pressed against each other in the edge regions of the films via elastic elements.

15 Claims, 5 Drawing Sheets

(51) Int. Cl.
    *G02F 1/1335*    (2006.01)
    *G02F 1/1333*    (2006.01)

(56) References Cited

U.S. PATENT DOCUMENTS

| | | | |
|---|---|---|---|
| 2008/0180629 A1* | 7/2008 | Fukai et al. | 349/192 |
| 2009/0009684 A1* | 1/2009 | Hsiao | 349/58 |
| 2013/0050822 A1* | 2/2013 | Suss et al. | 359/483.01 |

FOREIGN PATENT DOCUMENTS

| | | |
|---|---|---|
| DE | 4427173 C1 | 10/1995 |
| DE | 19804150 A1 | 8/1999 |
| DE | 102005059092 A1 | 6/2007 |
| DE | 102006029219 | 12/2007 |
| DE | 102006038175 A1 | 2/2008 |
| EP | 1873001 A1 | 1/2001 |
| JP | H1026758 | 1/1998 |
| JP | 2000-075306 | 3/2000 |
| JP | 2000223858 | 8/2000 |
| JP | 2006-208977 | 8/2006 |
| JP | 2006-215512 | 8/2006 |
| JP | 2007322343 | 12/2007 |
| JP | 2009229887 | 10/2009 |

OTHER PUBLICATIONS

International Search Report for application No. PCT/EP2010/069255 mailed Dec. 9, 2010.
Chinese Office Action dated Sep. 3, 2014.

* cited by examiner

DISPLAY ELEMENT FOR A DISPLAY UNIT IN A VEHICLE

CROSS-REFERENCE TO RELATED APPLICATIONS

This application claims priority from and the benefit of PCT Application No. PCT/EP2010/069255, filed on Dec. 9, 2010; and German Patent DE 10 2010 007 387.3, filed on Feb. 10, 2010; both entitled "Display Element for a Display Unit in a Vehicle", which are herein incorporated by reference.

BACKGROUND

The invention relates to a display element for the display unit of a vehicle, it being possible to backlight the display element by means of at least one light source.

The display element is preferably a component of the display unit of a multifunction display unit of motor vehicles.

DE 10 2006 038 175 A1 describes a display device for a motor vehicle with a display surface that has a symbol region for displaying permanently prescribed symbols. A matrix region is additionally provided for displaying variable display content. The matrix region preferably has a liquid crystal display element.

Furthermore, DE 198 04 150 B4 discloses a method for applying color filters and/or cover matrices composed of photo-emulsion layers, and a laminate for applying photo-emulsion layers. In this method, the color filters and/or cover matrices, which are composed of at least one photo-emulsion layer, are applied to a rigid substrate. Preferably serving as substrate is a glass substrate that is used for the construction of a liquid crystal display, and in which the at least one photo-emulsion layer is applied to one side of a flexible polarizing film. An adhesive layer is applied to the other side of the polarizing film, the layer structure being laminated onto the substrate with the aid of the adhesive layer applied to the polarizing film.

SUMMARY

It is an object of the present invention to specify a display element for a display unit of a vehicle that is improved by comparison with the prior art.

The object is achieved according to the invention by the features specified in claim 1.

Advantageous developments of the invention are the subject matter of the subclaims.

Owing to the penetration of moisture between the films, at the connecting points, particularly in the edge regions of films situated one upon another, there is the risk of the connection being undone, or of disturbance to the displays that are to be viewed.

This problem is largely removed with the arrangement according to the invention. In this case, at least one elastic element is used to exert pressure on a part of the edge region in which a first component and a second component adjoin one another. In this way, a contact pressure is produced on the two films, and produces a surface pressure between the components that has the effect of sealing against moisture.

The first component is a film provided with identifiers, while the second component is a polarizing film.

The display element includes a film, provided with identifying elements, and a polarizing film, which are arranged situated one above the other and are pressed against one another in their edge regions with the aid of elastic elements. The films rest with their edge regions on the circumferential edge of a base part. Scales, symbols and the like can be applied as identifying elements.

A development of the invention provides for the identifying elements to be printed onto the film. The polarizing film is expediently arranged upstream of the front side of the film so that it faces a viewer of the display element.

A circularly polarizing film is preferably used for the polarizing film.

In a possible embodiment, the film and the polarizing film have largely identical dimensions.

A further refinement of the invention provides that the elastic element is arranged on a frame. It is expedient in this case for the shape of the frame to correspond to the edge of the film provided with the identifiers, and/or of the polarizing film.

The elastic element can be designed as a circumferential seal that rests on the edge region of the films, or is composed of individual pressure pieces.

It advantageous design provides that clamping elements on which elastic pressure pieces are fitted are arranged on the frame.

The film provided with identifiers, and the polarizing film rest with their edge regions on the base surface of a base part such that the pressure forces applied by the elastic elements are supported there.

DRAWINGS

In the associated drawings:

Embodiments of the invention are described below with reference to the attached drawings.

DETAILED DESCRIPTION

Figure 1:
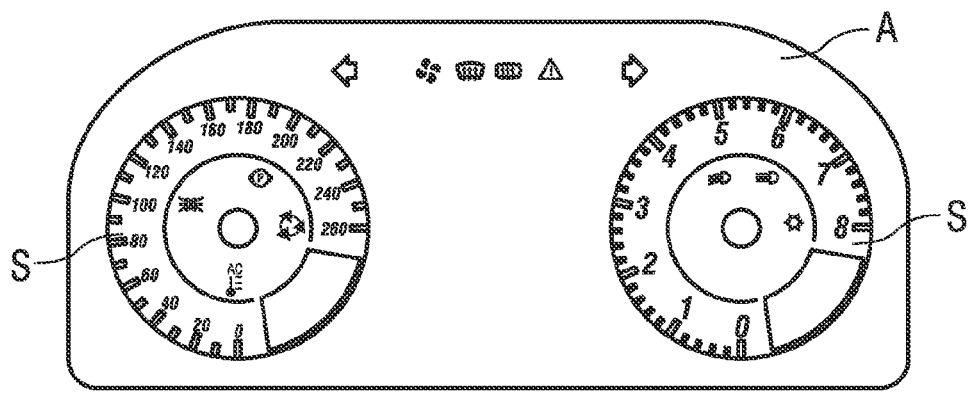
FIG. 1 shows the display surface of a display instrument.

FIG. 1 shows the front view of a display element 1 of a display unit for a vehicle, the display unit possibly being a component of a multifunction display unit. Two scale displays, direction indicators and graphic symbols for informing the driver are illustrated on the display element 1.

The display element 1 can be illuminated by means of at least one light source (not illustrated here) that is arranged behind the display element 1. If the ignition or the vehicle lighting is switched on, the scale displays are illuminated, wherein by way of example upon operation of an actuating lever for displaying the driving direction the appropriate direction display is illuminated and the direction indicator flashes. The graphic symbols of the display element 1 are illuminated upon activation and/or deactivation of the appropriate function.

Figure 2:
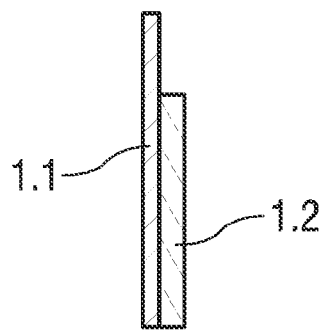
FIG. 2 shows a first section through the arrangement of FIG. 1.

FIG. 2 shows a section through the arrangement of FIG. 1. The display element 1 is composed of a printed film 1.1 and a polarizing film 1.2, the scale displays, the direction indicators and the graphic symbols being applied to the printed film 1.1.

The polarizing film 1.2 is a circularly polarizing film and is preferably located next to the printed side of the film 1.1, which faces the viewer of the display element 1, that is to say the polarizing film 1.2 is arranged to face the viewer and to be visible to the latter.

Owing to the action of the polarizing film 1.2, the non-illuminated display element 1 is invisible, since the polarizing film 1.2 prevents light reflected by the display element 1 from being visible to the viewer. Moreover, the transmission level of the light emitted by the light source is increased by means of the polarizing film 1.2. If the ignition or the vehicle lighting is not switched on, the display element 1 appears in homogeneous black, the scale displays and/or the graphic symbols are not visible until activation of the light source, and this is denoted as the so-called black panel effect. The polarizing film 1.2 can be bonded to the printed film 1.1 or be laminated. As an alternative to this, the polarizing film 1.2 can also be placed on the coated film 1.1 without a bonded connection.

Figure 3:
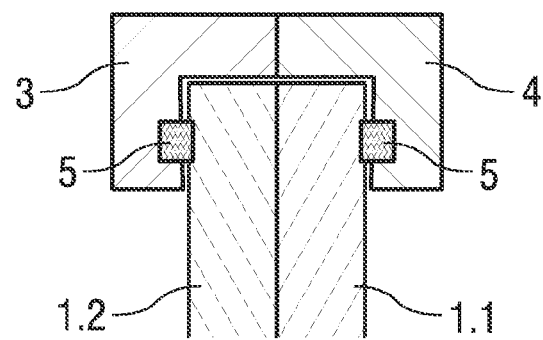
FIG. 3 shows an illustration to explain the mode of operation of the production of pressure.

FIG. 3 explains the operational principle of the production of pressure. The film 1.1 that is provided to configure the display surface of a vehicle display instrument with identifiers and is composed, for example, of Makrofol from Bayer, and a front, circularly polarized polarizing film 1.2 facing the driver are arranged next to one another. An elastic element 5 is respectively integrated in a left hand retaining part 3 and a right hand retaining part 4. When the two retaining parts 3 and 4 are pressed together via the elastic element 5, pressure is exerted on the edge region in which the printed film 1.1 and the polarizing film 1.2 are adjacent to one another, and so a defined contact pressure is produced. The contact pressure effects a surface pressure between the printed film 1.1 and the polarizing film 1.2 such that the lateral edges of the films 1.1 and 1.2 abutting one another are sealed against moisture. The retaining parts 3 and 4 can be connected to one another in the state pressed against one another, for example by a clip connection. It is preferable to use components made from rubber or other elastic materials as elastic elements, but it is also possible to use springs.

Figure 4:
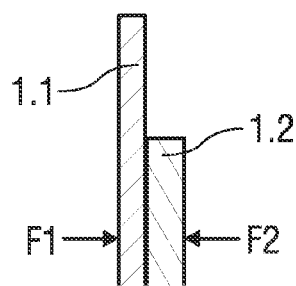
FIG. 4 shows an illustration to explain the force action.

The lines of action and the directions of the forces F1 and F2, which are exerted on the edge regions of the films 1.1 and 1.2 by the elastic elements 5 in order to build up the pressure for said surface pressure, are illustrated in FIG. 4. The lines of action of the forces F1 and F2 run perpendicular to the surfaces of the films 1.1 and 1.2.

Figure 5:
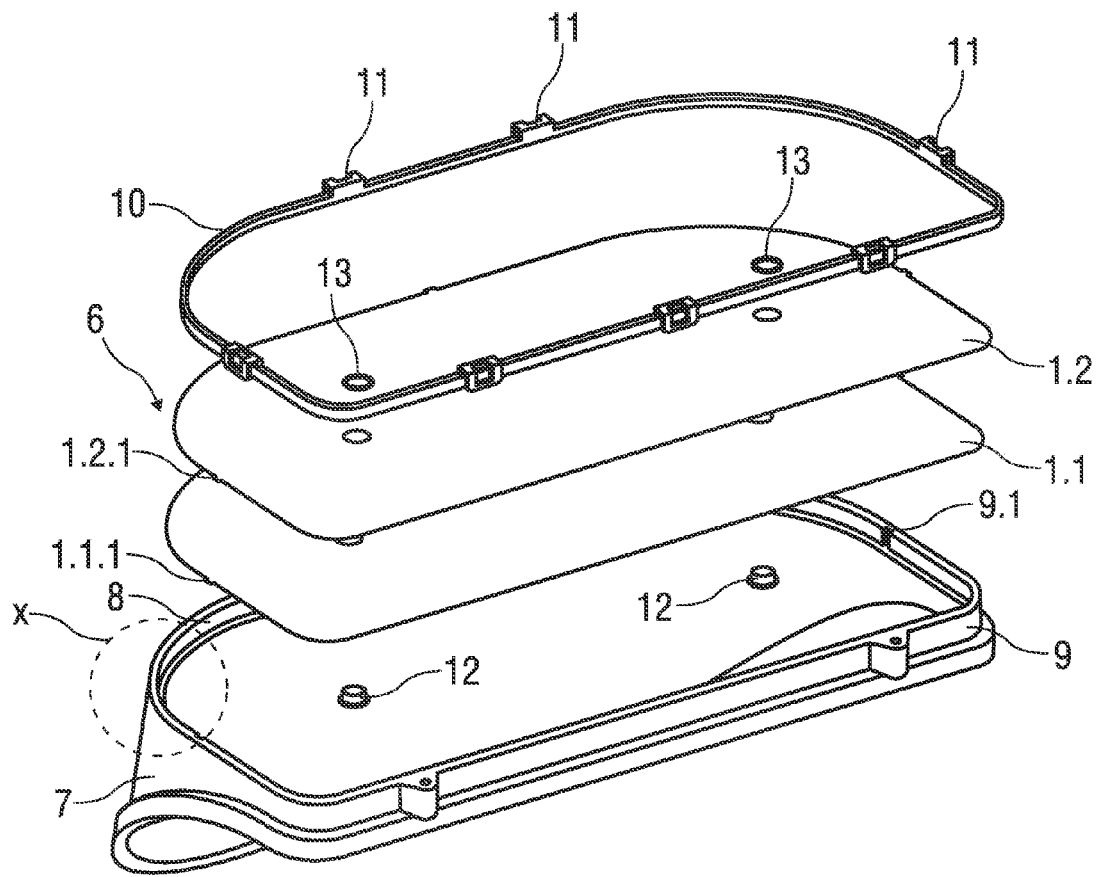
FIG. 5 shows the components of a display arrangement in an exploded illustration.

FIG. 5 shows an exploded illustration of a display arrangement 6 as a component of a display instrument to be built into a vehicle cockpit. The display arrangement 6 includes a base part 7 with a flat base surface 8 on which a wall 9 is located perpendicular thereto. The wall 9 extending over the circumference of the base surface 8 projects beyond the level of the base surface 8. The film 1.1 and the polarizing film 1.2 are inserted into the base part 7 in a fashion one above the other. In the mounted state, a frame 10 presses against the edges of the films 1.1 and 1.2. The outer shape of the frame 10 corresponds to the shape of the base surface 8 of the base part 7. The pressure is transmitted with the aid of elastic elements 5 onto the films 1.1 and 1.2, which rest on the base surface 8. Clamping elements 11 are fastened on the wall 9. In the example illustrated, the fastening is designed to be undone and is secured by a non-positive connection between clamping elements 11 and wall 9. In order to improve the positional fixing, the films 1.1 and 1.2 can have projections 1.1.1, 1.2.1 that engage in corresponding cutouts 9.1 in the wall 9.

Figure 6:
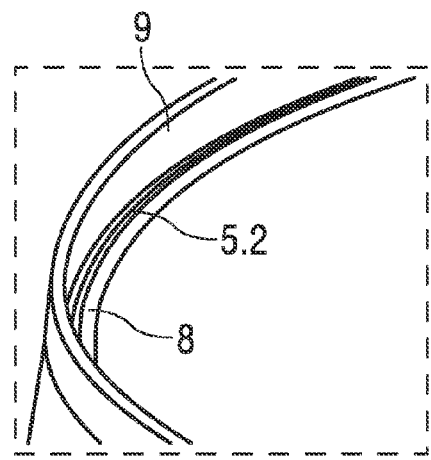
FIG. 6 shows an enlarged detail X from FIG. 5.

FIG. 6 shows an enlarged detail X from FIG. 5. In the design illustrated here, a circumferential elastic seal 5.2 rests on the inwardly projecting base surface 8 of the base part 7. The circumferential elastic seal 5.2 can be arranged above and/or below the films 1.1 and 1.2.

It is also possible to use elastic pressure pieces 5.1 that are fitted on the clamping elements 11 to exert the pressure on the films 1.1 and 1.2, which rest on the base surface 8 with their edge regions.

Figure 7:
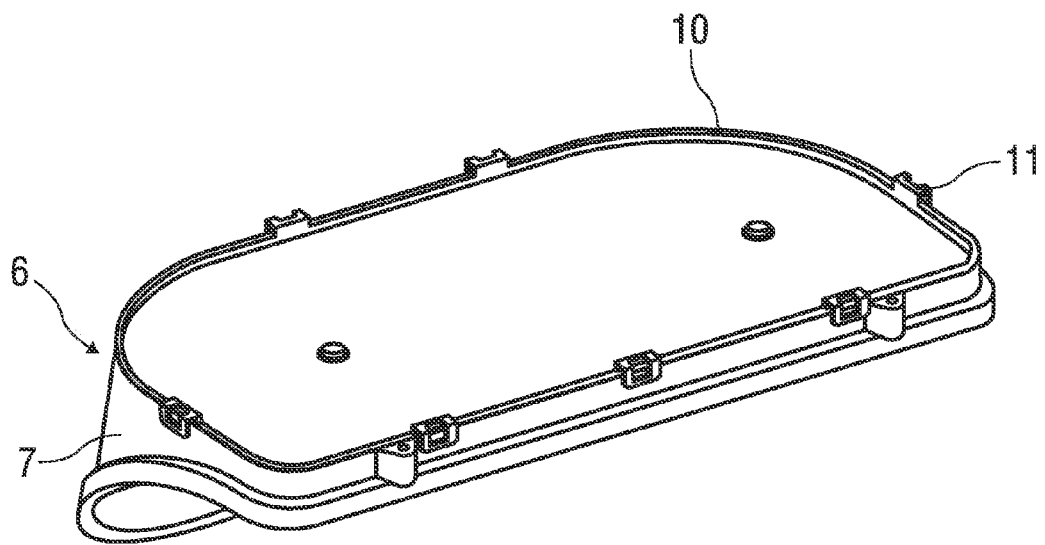
FIG. 7 shows a base part of the display arrangement in a perspective illustration.

The display arrangement 6 is illustrated in perspective in the mounted state in FIG. 7.

Figure 8:
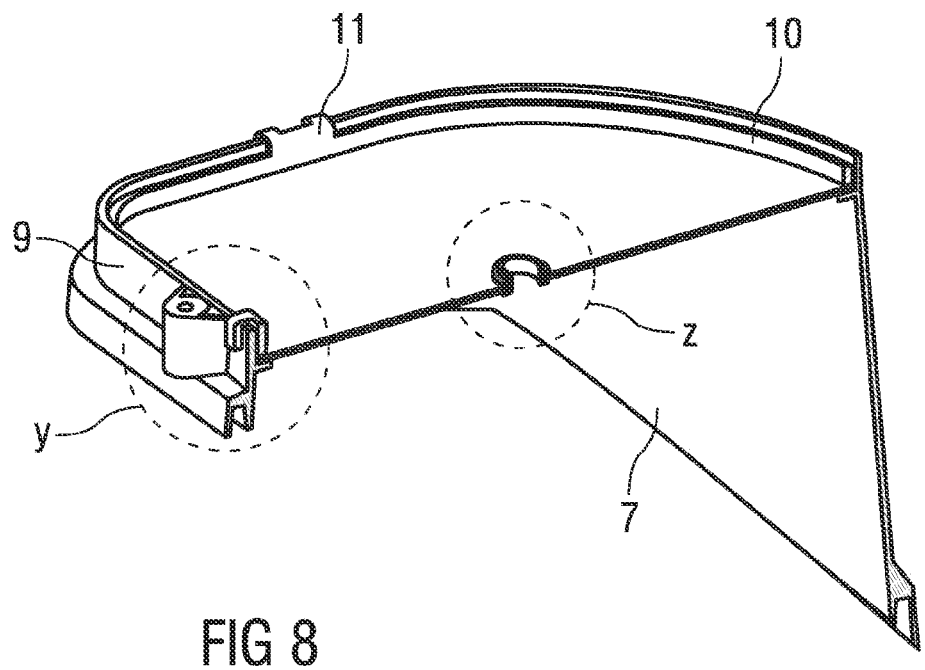
FIG. 8 shows a section of the base part in accordance with FIG. 7.

FIG. 8 shows a section of the display arrangement 6 in accordance with FIG. 7 in a partially cut away illustration. The details Y and Z marked there are explained in FIGS. 9 and 10.

Figure 9:
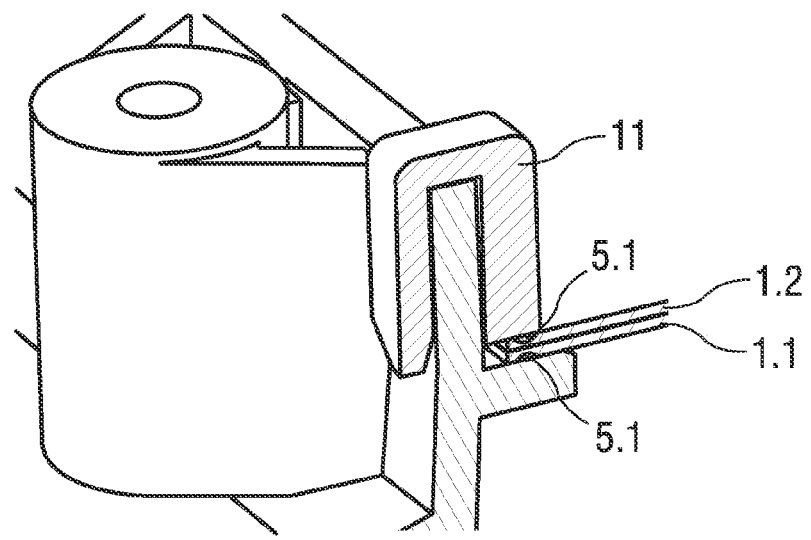
FIG. 9 shows a detail Y from FIG. 8.

The enlarged detail Y is illustrated in FIG. 9. It shows a clamping element 11 with the aid of which the elastic elements 5 are pressed against the films 1.1 and 1.2. Circumferential elastic seals 5.2 as illustrated in FIG. 6 can be used as elastic elements 5, or individual elastic pressure pieces 5.1 are arranged.

Figure 10:
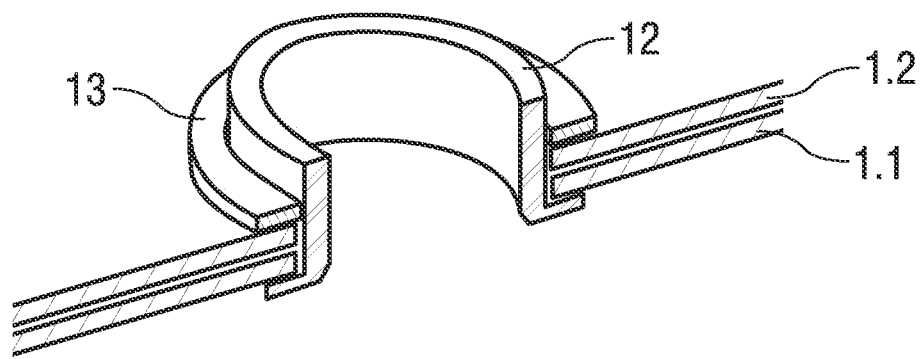
FIG. 10 shows a detail Z from FIG. 8.

FIG. 10 shows, enlarged as detail Z, a bush 12 that is arranged in the inner region of the films 1.1 and 1.2. Such bushes 12 can serve, for example, for fastening the films 1.1, 1.2 or to produce a defined spacing of the films from the display surface A. The bushes 12 surround the holes that are produced in the films 1.1 and 1.2. The bushes 12 are cylindrical parts that are bent outwards at their lower end so that they project onto the films 1.1 and 1.2. They are fixed on their top side with the aid of a securing ring 13.

1 Display element
1.1 Film with identifying elements
1.2 Polarizing film
1.1.1, 1.2.2 Projection
3 Left hand retaining part
4 Right hand retaining part
5 Elastic element
5.1 Pressure piece
5.2 Circumferential seal
6 Display arrangement
7 Base part
8 Base surface
9 Wall
9.1 Cutouts
10 Frame
11 Clamping element
12 Bush
13 Securing ring
A Display
S Scale

The invention claimed is:

1. A display element for a display unit of a vehicle, the display element being configured to backlight the display unit via at least one light source, the display element comprising a film having identifying elements, and a polarizing film, the film and the polarizing film being arranged one above the other;

wherein the film and the polarizing film are pressed against one another in edge regions via elastic elements, and the elastic elements are driven into contact with the film and the polarizing film by retaining features with sufficient pressure to establish a seal between the edge regions of the film and the polarizing film.

2. The display element as claimed in claim 1, wherein the identifying elements are printed onto the film.

3. The display element as claimed in claim 1, wherein the polarizing film is arranged upstream of a front side of the film so that it faces a viewer of the display element.

4. The display element as claimed in claim 1, wherein the polarizing film is a circularly polarizing film.

5. The display element as claimed in claim 1, wherein the film and the polarizing film have substantially identical dimensions.

6. The display element as claimed in claim 1, wherein the elastic element comprises a circumferential seal.

7. The display element as claimed in claim 1, wherein the elastic element comprises individual pressure pieces.

8. The display element as claimed in claim 1, wherein the elastic element is connected indirectly to a frame.

9. The display element as claimed in claim 8, wherein the frame has a shape corresponding to the edge of the film, the polarizing film, or some combination thereof.

10. The display element as claimed in claim 8, wherein clamping elements are arranged on the frame.

11. The display element as claimed in claim 10, wherein the elastic elements are fitted on the clamping elements.

12. The display element as claimed in claim 1, wherein the film and the polarizing film rest with the edge regions on a base surface of a base part.

13. The display element as claimed in claim 1, wherein the elastic element is connected directly to a frame.

14. A display element for a display unit of a vehicle, the display element being configured to backlight the display unit via at least one light source, the display element comprising a film having identifying elements, and a polarizing film, the film and the polarizing film being arranged one above the other and pressed against one another in edge regions via elastic elements;

wherein the elastic elements are connected indirectly to a frame, and clamping elements are arranged on the frame.

15. The display element as claimed in claim 14, wherein the elastic elements are fitted on the clamping elements.

* * * * *